United States Patent
Huff et al.

(10) Patent No.: US 10,328,669 B2
(45) Date of Patent: Jun. 25, 2019

(54) METHOD OF ASSEMBLING A STACK-UP WITH ADHESIVE SQUEEZE-OUT CAPTURE

(71) Applicant: FORD GLOBAL TECHNOLOGIES, LLC, Dearborn, MI (US)

(72) Inventors: Garret Sankey Huff, Ann Arbor, MI (US); Amanda Kay Freis, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 323 days.

(21) Appl. No.: 15/142,567

(22) Filed: Apr. 29, 2016

(65) Prior Publication Data

US 2017/0313026 A1 Nov. 2, 2017

(51) Int. Cl.
| | | |
|---|---|---|
| *B32B 33/00* | (2006.01) | |
| *B32B 7/08* | (2019.01) | |
| *B29C 65/00* | (2006.01) | |
| *B32B 37/00* | (2006.01) | |
| *B32B 38/10* | (2006.01) | |
| *B29C 63/00* | (2006.01) | |
| *B62D 23/00* | (2006.01) | |
| *B62D 31/00* | (2006.01) | |
| *B62D 33/00* | (2006.01) | |
| *B62D 39/00* | (2006.01) | |

(Continued)

(52) U.S. Cl.
CPC ............... *B32B 7/12* (2013.01); *B32B 37/12* (2013.01); *B32B 37/14* (2013.01); *B29C 65/5042* (2013.01); *B29C 65/562* (2013.01); *B29C 65/72* (2013.01); *B29C 66/0384* (2013.01); *B32B 37/18* (2013.01); *B32B 38/10* (2013.01); *B32B 2405/00* (2013.01)

(58) Field of Classification Search
CPC ..... B29C 65/48; B29C 65/50; B29C 65/5042; B29C 65/56; B29C 65/562; B29C 65/72; B29C 66/0384; B29C 66/304; B29C 66/45; B29C 66/1122; B32B 37/12; B32B 37/18; B32B 2037/1246; B32B 2037/1269; B32B 38/10; F16B 11/006
USPC ............... 156/60, 90, 91, 92, 247, 701, 714; 180/89.1
See application file for complete search history.

(56) References Cited

U.S. PATENT DOCUMENTS

| | | |
|---|---|---|
| 3,655,424 A | 4/1972 | Orowan |
| 5,253,965 A | 10/1993 | Angel |

(Continued)

FOREIGN PATENT DOCUMENTS

| | | |
|---|---|---|
| EP | 0623758 A2 | 11/1994 |
| EP | 1533044 A1 | 5/2005 |

OTHER PUBLICATIONS

English Machine Translation of EP0623758A1.

*Primary Examiner* — Philip C Tucker
*Assistant Examiner* — Brian R Slawski
(74) *Attorney, Agent, or Firm* — Ray Coppiellie; King & Schickli, PLLC

(57) ABSTRACT

A method is provided for assembling a stack-up including a first workpiece with a clearance hole and a second workpiece. The method comprises adhering an adhesive to a first face of the first workpiece so as to completely cover and close the clearance hole and securing the second workpiece to a second face of the first workpiece with an adhesive. A stack-up and the method of capturing adhesive squeeze-out during a stack-up assembly process are also disclosed.

8 Claims, 4 Drawing Sheets

(51) Int. Cl.
  *B32B 7/12*   (2006.01)
  *B32B 37/12*  (2006.01)
  *B32B 37/14*  (2006.01)
  *B29C 65/72*   (2006.01)
  *B29C 65/50*   (2006.01)
  *B32B 37/18*   (2006.01)
  *B29C 65/56*   (2006.01)

(56) References Cited

U.S. PATENT DOCUMENTS

| | | |
|---|---|---|
| 8,458,987 B2 | 6/2013 | Becker |
| 8,657,366 B2 | 2/2014 | Greve |
| 2014/0183895 A1* | 7/2014 | Awano ................ B62D 29/005 |
| | | 296/29 |
| 2015/0246319 A1* | 9/2015 | Furuyama .......... B01D 39/1692 |
| | | 55/486 |

* cited by examiner

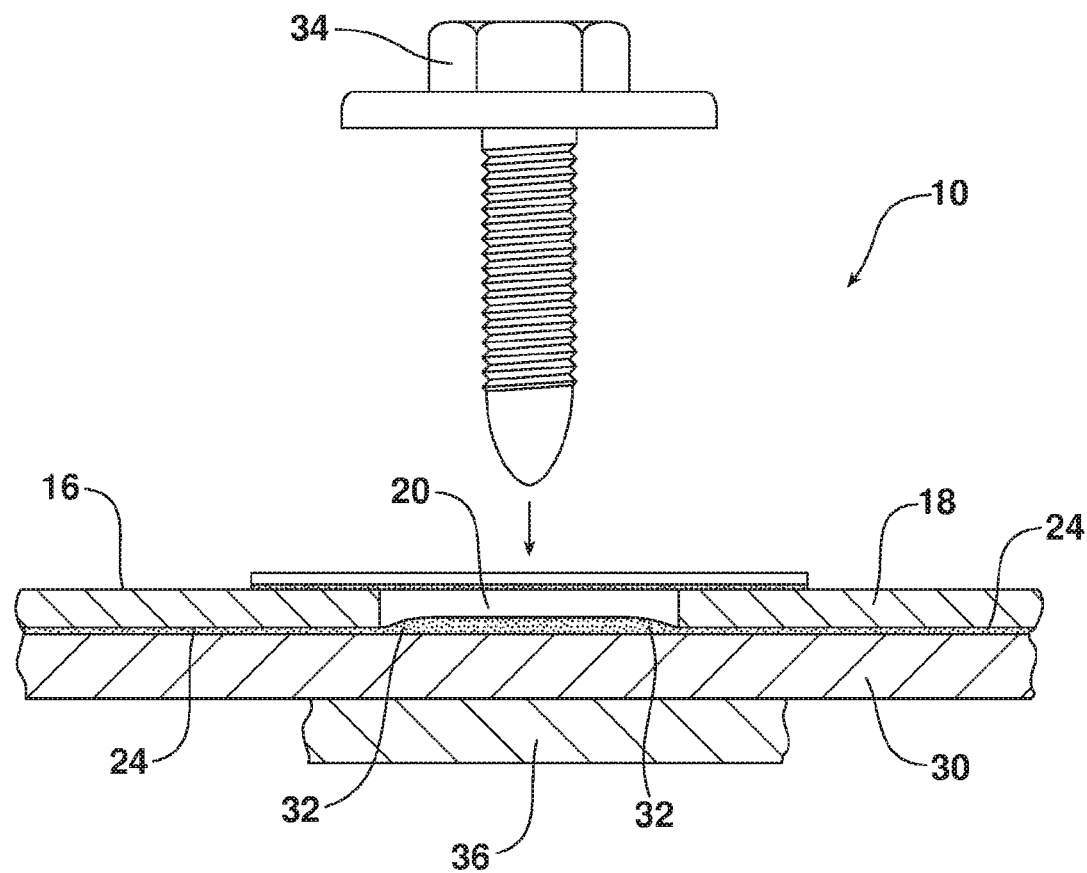

METHOD OF ASSEMBLING A STACK-UP WITH ADHESIVE SQUEEZE-OUT CAPTURE

TECHNICAL FIELD

This document relates generally to stack-up assembly processes and, more particularly, to a method of assembling a stack-up which provides for adhesive squeeze-out capture in order to maintain a clean, exposed face on a workpiece including a clearance hole or the like.

BACKGROUND

This document relates to a new and improved method of assembling a stack-up that is particularly useful where a workpiece of the stack-up incorporates a clearance hole located near to or over the top of an adhesive or sealant.

More specifically, hybrid joints are joints that utilize mechanical joints in conjunction with adhesive. Many such joints require clearance holes for receiving particular fasteners such as self-pierce and blind rivets, bolts, flow-drill screws (FDS), weld rivets and the like. Under these circumstances the control of the adhesive flow is important in order to minimize the egress of adhesive from the joint. If the adhesive flows to the fastener and/or the exposed surface of the workpiece body, the adhesive creates both quality and manufacturing problems. In many applications it is simply not acceptable for adhesive to get on the tooling or contaminate other machinery within the assembly plant. This is particularly true in automobile assembly when constructing a body-in-white structure for a motor vehicle.

SUMMARY

In accordance with the purposes and benefits described herein, a method is provided of assembling a stack-up including a first workpiece with a clearance hole and a second workpiece. That method comprises the steps of adhering an adhesive tape to a first face of the first workpiece so as to completely cover and close the clearance hole and securing the second workpiece to a second face of the first workpiece with an adhesive.

More specifically, the method may include the step of applying an adhesive to at least one of the second face of the first workpiece and a third face of the second workpiece, aligning the first workpiece with the second workpiece and compressing the first workpiece and the second workpiece together to adhere the first workpiece to the second workpiece.

Further, the method includes preventing any adhesive that may squeeze out from between the second face of the first workpiece and the third face of the second workpiece from passing through the clearance hole and being deposited on the first face of the first workpiece during assembly of the stack-up. In addition, the method may include inserting a fastener through the tape and the clearance hole into the second workpiece. Such a fastener may be utilized in securing a third workpiece to the second workpiece.

Still further, the method includes preventing any adhesive under the adhesive tape from being deposited on the first or exposed face of the first workpiece during insertion of the fastener. This step may then be followed by removing the adhesive tape from the first face of the first workpiece. This is done once all concern has been eliminated respecting the expulsion of adhesive through the clearance hole onto the first or exposed face of the first workpiece.

In accordance with an additional aspect, a stack-up is provided. That stack-up comprises a first workpiece including a clearance hole, a second workpiece, an adhesive between the first workpiece and the second workpiece and an adhesive tape secured on the first or exposed face of the first workpiece and closing the clearance hole. More specifically, the adhesive tape adheres to and seals with a margin of the first workpiece encompassing the clearance hole so as to prevent any adhesive from passing through the clearance hole and being deposited on the exposed or first face of the first workpiece during assembly of the stack-up.

In accordance with yet another aspect, a method is provided of capturing adhesive squeeze-out during a stack-up assembly process. That method comprises the steps of covering and closing a clearance hole in a workpiece with an adhesive tape and capturing any of the adhesive squeezed out from under the workpiece under the adhesive tape in the clearance hole.

In the following description, there are shown and described several preferred embodiments of the method of assembling a stack-up, the stack-up and the method of capturing any adhesive squeeze-out during a stack-up assembly. As it should be realized, the methods and stack-up are capable of other, different embodiments and their several details are capable of modification in various, obvious aspects all without departing from the methods and assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the methods and stack-up and together with the description serve to explain certain principles thereof. In the drawing figures:

FIG. 4 is a cross-sectional view illustrating the utilization of a flow-drill screw to secure the second workpiece to a third workpiece.

Reference will now be made in detail to the present preferred embodiments of the method and stack-up, examples of which are illustrated in the accompanying drawing figures.

DETAILED DESCRIPTION

Figure 1:
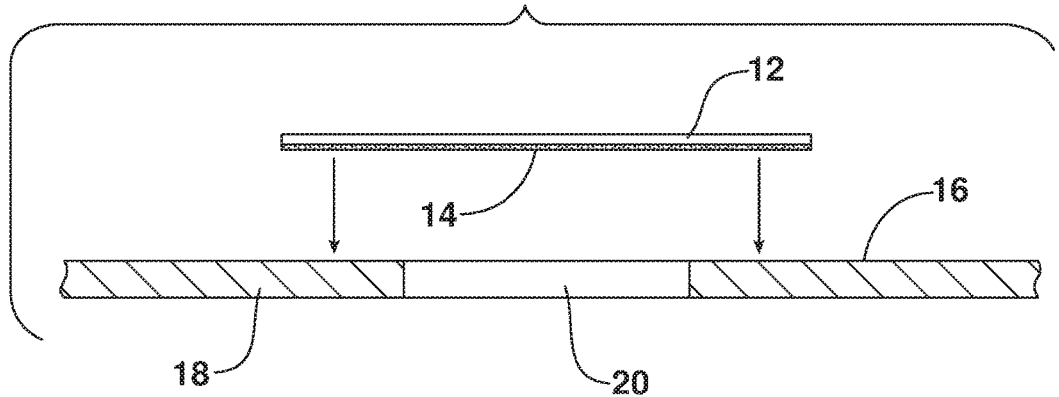
FIG. 1 is a cross-sectional view illustrating the application of an adhesive tape so as to cover and close a clearance hole in a first workpiece.
Figure 2:
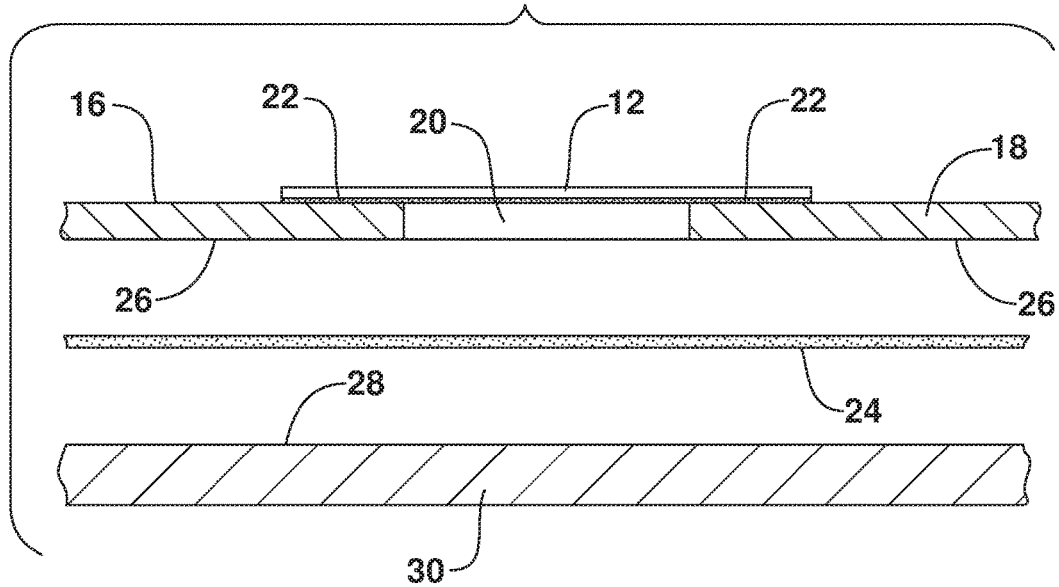
FIG. 2 is a cross-sectional view illustrating the application of adhesive to secure the first workpiece with a second workpiece.

A method of assembling a stack-up 10, the stack-up and a method of capturing adhesive squeeze-out during a stack-up assembly process will now be described in detail with reference to FIGS. 1-6. As illustrated in FIG. 1, a tape 12 having an adhesive face 14 is adhered to a first or exposed face 16 of a first workpiece 18 so as to completely cover and close a clearance hole 20 provided in that first workpiece. As illustrated in FIG. 2, the tape 12 adheres to and seals with a margin 22 of the first workpiece 18 encompassing the clearance hole 20.

As further illustrated in FIG. 2, an adhesive 24 is applied to at least one of the second face 26 of the first workpiece 18 and a third face 28 of a second workpiece 30. The first workpiece 18 and second workpiece 30 are then properly aligned and then pressed together (note action arrows A) to adhere the first workpiece to the second workpiece (see FIG. 3). As illustrated in FIG. 3a, the pressure applied to adhere the first workpiece 18 to the second workpiece 30 may cause adhesive to wet-out and fill the void left from the clearance hole between the second and third faces 26, 28 of the respective workpieces 18, 30. The squeezing out of the adhesive is illustrated by action arrows B in FIG. 3a and that adhesive actually squeezed out is illustrated by reference numeral 32.

As should be appreciated from viewing FIG. 3a, the tape 12 covers and closes the clearance hole 20 thereby preventing any adhesive 32 that is squeezed out from the interface between the first and second workpieces 18, 30 from passing through the clearance hole and being deposited on the first or exposed face 16 of the first workpiece 18 during the assembly of the stack-up 10.

Figure 6:
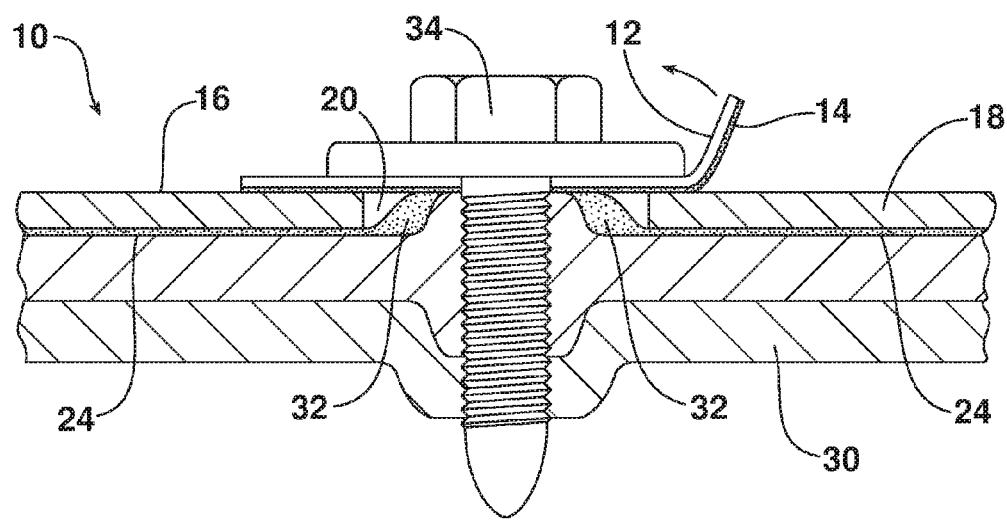
FIG. 6 is an illustration similar to FIG. 5 but showing the adhesive tape being removed from the first workpiece.

As illustrated in FIG. 4, the assembly method may next include the step of inserting a fastener 34 through the tape 12 and the clearance hole 20 into the second workpiece 30 in order to secure the second workpiece to a third workpiece 36. In the illustrated embodiment, the fastener 34 is a flow-drill screw (FDS). It should be appreciated that in other embodiments the fastener may comprise, for example, a self-pierce rivet, a blind rivet, a bolt, a weld rivet or any appropriate fasteners of other developing technologies. Such fasteners 34 may cause localized defects. In the case of a flow-drill screw fastener 34, some splatter may occur if no tape 12 is used. The fastener 34 draws the first, second and third workpieces 18, 30 and 36 tightly together, squeezing additional adhesive 32 into the opening 20. Significantly, the tape 12 maintains sufficient integrity during the insertion of the fastener 34 to capture any splatter and prevent any splatter and adhesive 32 from being deposited on the first or exposed face 16 of the first workpiece 18 (see FIG. 5). Subsequently as illustrated in FIG. 6, the tape 12 may be removed from the first face 16 of the first workpiece 18 when any potential for the depositing of adhesive or splatter on the first/exposed face 16 has been eliminated.

As should be appreciated from the foregoing description, a method of capturing adhesive squeeze-out 32 during a stack-up assembly process has been provided. That method may be broadly described as including the steps of covering and closing a clearance hole 20 with an adhesive tape 12 and capturing any adhesive 32 squeezed out from under the workpiece 18 under the adhesive tape in the clearance hole 20. As should be appreciated, since the assembly method maintains the exposed face 16 of the first workpiece 18 free and clear of adhesive, the method is particularly useful when constructing a body-in-white structure for a motor vehicle as the cleanliness of the body-in-white structure while it is assembled is extremely important to the manufacturing process.

Figure 3:
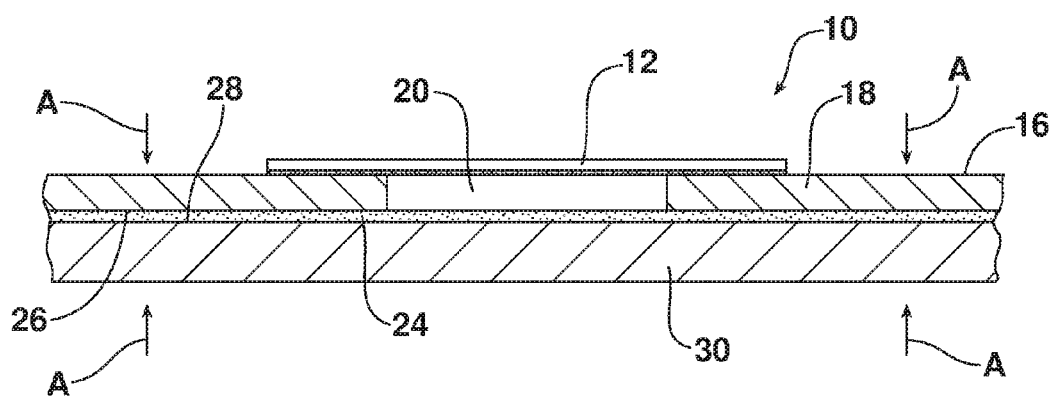
FIG. 3 illustrates the application of pressure to provide good contact between the first workpiece and the second workpiece during the process of assembling the two workpieces together.
Figure 3A:
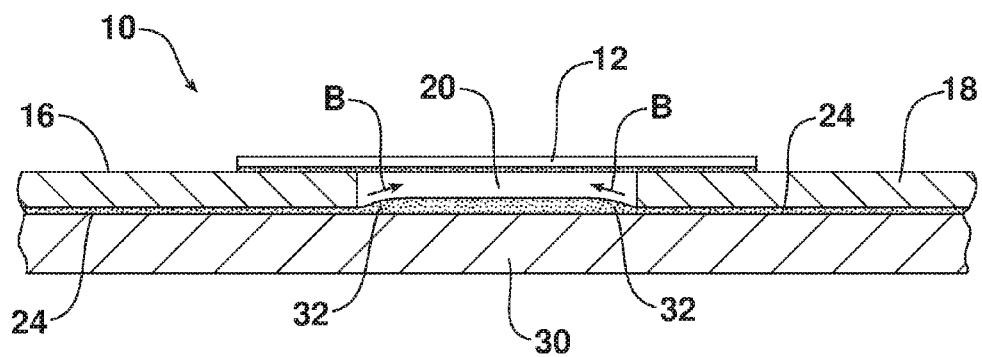
FIG. 3a illustrates some of the adhesive being squeezed out into the clearance hole in the first workpiece from the interface between the first and second workpieces.
Figure 5:
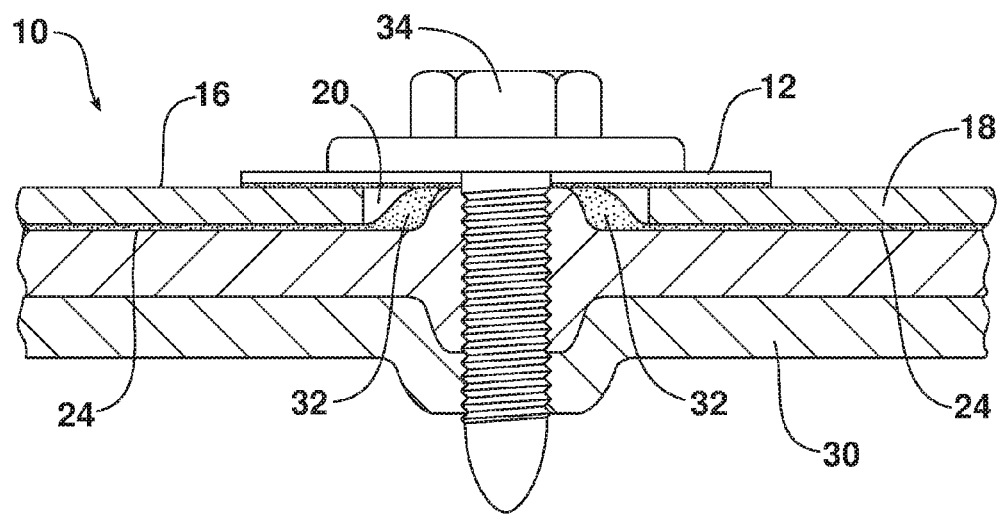
FIG. 5 illustrates the connection after the driving of the flow-drill screw.

Consistent with the above description, FIG. 3 shows the stack-up 10 which comprises the first workpiece 18 including the clearance hole 20, the second workpiece 30, the adhesive 24 between the two workpieces and the adhesive tape 12 secured on the exposed face 16 of the first workpiece enclosing the clearance hole.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A method of assembling a stack-up including a first workpiece with a clearance hole and a second workpiece, said method comprising:
    adhering an adhesive tape to a first face of said first workpiece so as to completely cover and close said clearance hole;
    securing said second workpiece to a second face of said first workpiece with an adhesive; and
    inserting a fastener through said tape and said clearance hole into said second workpiece.

2. The method of claim 1, including preventing any adhesive from passing through said clearance hole and being deposited on said first face during assembly of said stack-up.

3. The method of claim 1, including applying an adhesive to at least one of said second face of said first workpiece and a third face of said second workpiece, aligning said first workpiece with said second workpiece and pressing said first workpiece and said second workpiece together to assemble said first workpiece to said second workpiece.

4. The method of claim 3, including preventing any adhesive squeezed out from between said second face and said third face from passing through said clearance hole and being deposited on said first face during assembly of said stack-up.

5. The method of claim 4, including preventing any adhesive under said adhesive tape from being deposited on said first face during insertion of said fastener.

6. The method of claim 5, including removing said adhesive tape from said first face of said first workpiece.

7. The method of claim 6, including securing a third workpiece to said second workpiece with said fastener.

8. The method of claim 7, including using said method when constructing a body-in-white structure for a motor vehicle.

* * * * *